(12) United States Patent
Lu

(10) Patent No.: US 9,365,083 B2
(45) Date of Patent: Jun. 14, 2016

(54) BUILT-IN TIRE PRESSURE MONITORING AND ALARMING DEVICE

(71) Applicant: Hongyan Lu, Guangdong (CN)

(72) Inventor: Hongyan Lu, Guangdong (CN)

( * ) Notice: Subject to any disclaimer, the term of this patent is extended or adjusted under 35 U.S.C. 154(b) by 0 days.

(21) Appl. No.: 14/412,465

(22) PCT Filed: Sep. 25, 2012

(86) PCT No.: PCT/CN2012/081944
§ 371 (c)(1),
(2) Date: Jan. 2, 2015

(87) PCT Pub. No.: WO2014/005381
PCT Pub. Date: Jan. 9, 2014

(65) Prior Publication Data
US 2015/0123779 A1    May 7, 2015

(30) Foreign Application Priority Data

Jul. 6, 2012  (CN) .......................... 2012 1 0233436

(51) Int. Cl.
*B60C 23/04* (2006.01)

(52) U.S. Cl.
CPC ........... *B60C 23/0494* (2013.01); *B60C 23/041* (2013.01); *B60C 23/0496* (2013.01); *B60C 23/0408* (2013.01)

(58) Field of Classification Search
None
See application file for complete search history.

(56) References Cited

U.S. PATENT DOCUMENTS

| | | | | |
|---|---|---|---|---|
| 3,453,590 A * | 7/1969 | Burgess | ................ | B60C 23/041 116/34 R |
| 3,713,092 A * | 1/1973 | Ivenbaum | ........... | B60C 23/0496 340/447 |
| 4,037,192 A * | 7/1977 | Cowit | ................ | B60C 23/0433 200/61.25 |
| 4,048,614 A * | 9/1977 | Shumway | ........... | B60C 23/0494 200/61.25 |
| 4,254,312 A * | 3/1981 | Migrin | ................ | B60C 23/0408 200/61.25 |
| 4,734,674 A * | 3/1988 | Thomas | .............. | B60C 23/0408 200/61.25 |
| 4,737,760 A * | 4/1988 | Huang | ................ | B60C 23/0408 116/34 R |
| 5,040,561 A * | 8/1991 | Achterholt | .......... | B60C 23/0408 116/34 R |
| 5,065,134 A * | 11/1991 | Schmid | ............... | B60C 23/0408 200/61.22 |
| 5,119,066 A * | 6/1992 | Ballyns | ............... | B60C 23/0408 116/34 R |
| 5,754,101 A * | 5/1998 | Tsunetomi | .......... | B60C 23/0496 340/442 |
| 5,774,048 A * | 6/1998 | Achterholt | .......... | B60C 23/0408 340/442 |
| 6,006,600 A * | 12/1999 | Cheng | ................. | B60C 23/0496 116/34 R |
| 6,034,596 A * | 3/2000 | Smith | ................... | B60C 23/009 340/445 |
| 6,194,998 B1 * | 2/2001 | Huang | .................. | B60C 23/041 340/442 |
| 6,252,498 B1 * | 6/2001 | Pashayan, Jr. | ...... | B60C 23/0408 340/447 |

(Continued)

*Primary Examiner* — Benjamin C Lee
*Assistant Examiner* — Chico A Foxx
(74) *Attorney, Agent, or Firm* — Jackson IPG PLLC; Demian K. Jackson

(57) ABSTRACT

The present invention discloses a built-in tire pressure monitoring and alarming device. A housing is provided therein with a reference chamber and an inlet pipe extended from the reference chamber to a valve stem, and a reference chamber valve capable of sealing and opening the inlet pipe is mounted within the inlet pipe. A throttle core of the reference chamber valve is directly resisted against a core bar of a throttle core. During the tire is inflated, the throttle core is pushed open, the core bar of the throttle core is pushed against the valve core, and then the reference chamber valve is opened so that the reference chamber is inflated. After the inflation is accomplished, the throttle core is restored and the reference chamber valve is closed so that the reference chamber is sealed.

2 Claims, 1 Drawing Sheet

(56) References Cited

U.S. PATENT DOCUMENTS

| | | | | |
|---|---|---|---|---|
| 6,696,936 | B2* | 2/2004 | Yamagiwa | B60C 23/0408 340/442 |
| 6,799,455 | B1* | 10/2004 | Neefeldt | B60C 23/0496 73/146 |
| 6,854,335 | B1* | 2/2005 | Burns | B60C 23/0425 73/728 |
| 7,028,541 | B2* | 4/2006 | Uleski | B60C 23/0494 73/146 |
| 7,336,164 | B2* | 2/2008 | Apostolopoulos | B60C 23/0428 116/34 R |
| 7,732,722 | B1* | 6/2010 | Singh | H01H 35/32 200/82 R |
| 8,714,002 | B2* | 5/2014 | Faretra | B60C 23/064 340/445 |
| 2003/0001733 | A1* | 1/2003 | Huang | B60C 23/04 340/442 |
| 2004/0112129 | A1* | 6/2004 | Lundqvist | B60C 23/0408 73/146 |
| 2006/0272402 | A1* | 12/2006 | Yin | B60C 23/0494 73/146.8 |
| 2006/0272758 | A1* | 12/2006 | Yin | B60C 23/0408 152/427 |
| 2007/0044552 | A1* | 3/2007 | Huang | B60C 23/0496 73/146.3 |
| 2007/0109112 | A1* | 5/2007 | Lee | B60C 23/0408 340/447 |
| 2008/0055059 | A1* | 3/2008 | Murakami | B60C 23/0408 340/442 |
| 2008/0190189 | A1* | 8/2008 | Milanovich | B60C 23/0496 73/146.8 |
| 2015/0122388 | A1* | 5/2015 | Durr | B60C 23/12 152/450 |

* cited by examiner

BUILT-IN TIRE PRESSURE MONITORING AND ALARMING DEVICE

FIELD OF THE INVENTION

The present invention relates to a device for monitoring tire pressure and giving an alarming when the tire pressure is too low, and particularly to a device built in a tire for monitoring tire pressure and giving an alarming.

BACKGROUND OF THE INVENTION

At present, tire pressure monitoring and alarming devices available in the market mainly are in form of electronic sensors which sense air pressure within a tire via electronic chips. The electronic chips need to be powered for 24 hours a day, thereby causing large power consumption. As a result, the battery is to be exhausted easily and needs to be replaced frequently. It is inconvenient for users. Particularly, once the battery is exhausted and is not replaced by a user in time, the alarming device will not work normally, thereby resulting in potential hazards. In addition, electronic chips have certain requirements on the working environment, and are likely to break down when working in severe environments and thus unable to work normally. Furthermore, the electronic chips for sensing air pressure are high in cost.

SUMMARY OF THE INVENTION

The present invention is aimed at providing a built-in tire pressure monitoring and alarming device which has low power consumption, safe and reliable operation, better adaptation to environments and relatively low cost.

The built-in tire pressure monitoring and alarming device provided by the present invention includes a housing and a valve stem communicated with the housing, a throttle core being provided at one end of the valve stem, wherein the housing is provided therein with a reference chamber, an alarming signal transmitting module and a battery, a part of the wall of the reference chamber is an elastic metal diaphragm, a cathode contact of the alarming signal transmitting module is electrically connected to a cathode of a power supply while an anode contact thereof is close to and directly faces the elastic metal diaphragm of the reference chamber, and the elastic metal diaphragm of the reference chamber is electrically connected to the anode of the battery; an inlet pipe is extended from the reference chamber to the valve stem, and a reference chamber valve capable of sealing and opening the inlet pipe is mounted within the inlet pipe; an inward boss is provided on the inner wall of the inlet pipe into which a valve body of the reference chamber valve is screwed through threads, a sealing collar is provided between the valve body and the boss, a valve core of the reference chamber valve is inserted into the middle of the valve body and extended out from a front end of the valve body with a nut being screwed on the end portion of the extended end, an annular groove having a sealing ring mounted therein is extended outward from an edge position of the nut, a flange is provided at a position opposing to the valve core so that the sealing collar is clamped between the nut and the flange, and an end face of the sealing ring runs beyond the edge of the flange with the exceeded portion being opposite to a front end face of the valve body; and, the valve core of the reference chamber valve is directly resisted against a core bar of a throttle core or against the core bar of the throttle core via an ejector rod, a spring being provided between the throttle core and the valve body, the spring applying a force onto the valve core so that the edge of the sealing ring running beyond the flange can be tightly pressed on the front end face of the valve body.

The built-in tire pressure monitoring and alarming device provided by the present invention is mounted inside a throttle hole of a tire hub. When the tire is inflated, the throttle core in the valve stem is pushed open, and the core bar of the throttle core or the ejector rod resisted against the core bar can push the core bar of the reference chamber valve to move toward the inside of the reference chamber, the sealing ring clamped between the annular groove of the nut and the flange of the throttle core thus moves along with the core bar, so that the edge portion of the end face of the sealing ring running beyond the flange is separated from the front end face of the valve body. At this time, the reference chamber is opened, and air enters the reference chamber from an opening of the reference chamber. After the inflation is accomplished, the throttle core is loosened, the core bar of the throttle core is restored, the core bar or the ejector rod does not apply any force onto the throttle core of the reference chamber calve any more, and the spring instead applies a force onto the valve core so that the edge of the sealing ring running beyond the flange is tightly pressed on the front end face of the valve body. As a result, the reference chamber valve is closed, the reference chamber is sealed, and the pressure is kept constant as at the end of inflation. After the pressure inside the tire drops, as the pressure inside the reference chamber remains unchanged, there will be a difference in pressure between the inside and outside of the reference chamber. In this case, the elastic metal diaphragm as the wall of the reference chamber will generate an outward deformation due to the difference in pressure. When the tire pressure drops to a certain degree, when the deformed elastic metal diaphragm comes into contact with the anode contact of the alarming signal transmitting module, the alarming signal transmitting module is powered on and sends a signal, and then the alarming device on a vehicle receives the signal and gives an alarming.

In the built-in tire pressure monitoring and alarming device, the monitoring of a tire pressure difference and alarming are realized by powering on an alarm circuit due to the deformation of the elastic metal diaphragm serving as the wall of the reference chamber resulted from the difference in pressure. The alarming device is of mechanical sensing and is stable and reliable in operation, and thus capable of functioning in severe working environments; furthermore, the alarming device has a low failure rate. Moreover, the alarm circuit of the alarming device will be powered off when in a non-alarming state, so there is no current, and thus the alarming device has extremely low power consumption as it does not need to consume power, and it is unnecessary to frequently replace the battery. As a result, the problem that the alarm circuit cannot work due to the exhaustion of the battery is overcome, and the potential hazards resulted from this problem are thus avoided, so that the operation is safer and more reliable. In addition, as the cost of the elastic metal diaphragm is far lower than that of the electronic sensor, the built-in tire pressure monitoring and alarming device provided by the present invention is low in cost too.

DETAILED DESCRIPTION OF THE PREFERRED EMBODIMENTS

Figure 1:
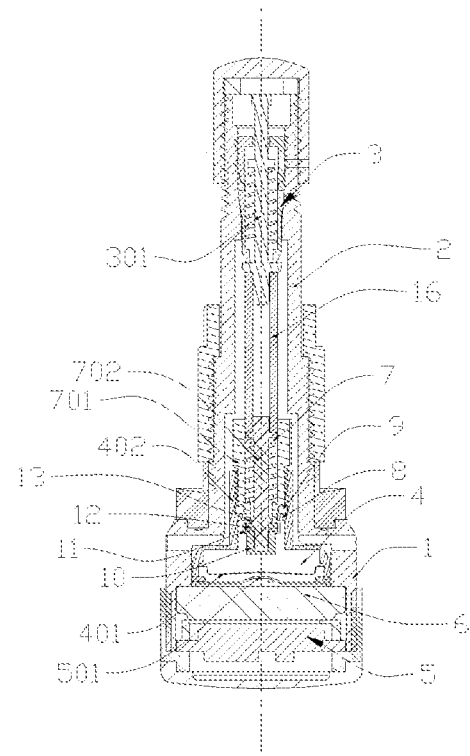
FIG. 1 is a structural diagram of a built-in tire pressure monitoring and alarming device according to the present invention.
Figure 2:
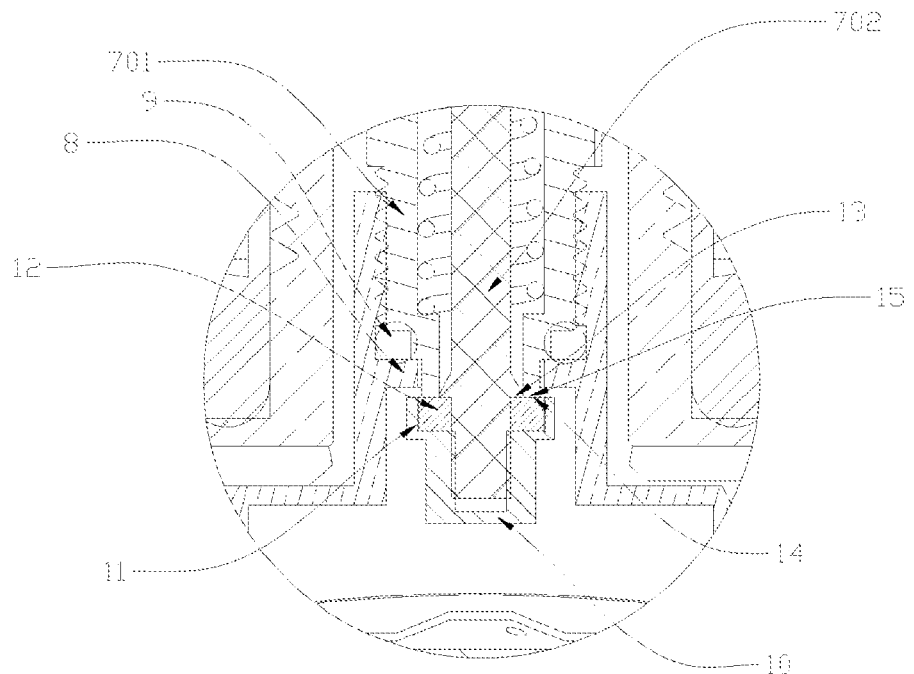
FIG. 2 is a partially enlarged view of FIG. 1.

As illustrated in the FIG. 1 and FIG. 2, a built-in tire pressure monitoring and alarming device is provided, including a housing 1 and a valve stem 2 communicated with the housing, a throttle core 3 being provided at one end of the valve stem; the housing is provided therein with a reference chamber 4, an alarming signal transmitting module 5 and a battery 6, a part of the wall of the reference chamber is an elastic metal diaphragm 401, a cathode contact of the alarming signal transmitting module is electrically connected to a cathode of a power supply while an anode contact 501 thereof is close to and directly faces the elastic metal diaphragm of the reference chamber, and the elastic metal diaphragm of the reference chamber is electrically connected to the anode of the battery; an inlet pipe 402 is extended from the reference chamber to the valve stem, and a reference chamber valve 7 capable of sealing and opening the inlet pipe is mounted within the inlet pipe; an inward boss 8 is provided on the inner wall of the inlet pipe into which a valve body of the reference chamber valve 701 is screwed through threads, a sealing collar 9 is provided between the valve body and the boss, a valve core 702 of the reference chamber valve is inserted into the middle of the valve body and extended out from a front end of the valve body with a nut 10 being screwed on the end portion of the extended end, an annular groove 11 having a sealing ring 12 mounted therein is extended outward from an edge position of the nut, a flange 13 is provided at a position opposing to the valve core so that the sealing collar is clamped between the nut and the flange, and an end face of the sealing ring runs beyond the edge of the flange with the exceeded portion 14 being opposite to a front end face 15 of the valve body; and, the valve core of the reference chamber valve is resisted against the core bar 301 of the throttle core via an ejector rod 16 (see FIG. 1) or directly against a core bar of a throttle core (not shown), a spring 17 being provided between the valve core and the valve body, the spring applying a force onto the valve core so that the edge of the sealing ring running beyond the flange can be tightly pressed on the front end face of the valve body.

The housing is divided into upper and lower portions which are in threaded connection to each other. When the battery is exhausted, it is convenient to replace the battery, thereby avoiding wasting.

What is claimed is:

1. A built-in tire pressure monitoring and alarming device, comprising:
  a housing and a valve stem communicated with the housing,
  a throttle core being provided at one end of the valve stem, wherein the housing is provided therein with:
    a reference chamber,
    an alarming signal transmitting module and
    a battery,
    a part of the wall of the reference chamber is an elastic metal diaphragm,
    a cathode contact of the alarming signal transmitting module is electrically connected to a cathode of a power supply while an anode contact thereof is close to and directly faces the elastic metal diaphragm of the reference chamber, and
    the elastic metal diaphragm of the reference chamber is electrically connected to the anode of the battery;
  an inlet pipe is extended from the reference chamber to the valve stem, and a reference chamber valve capable of sealing and opening the inlet pipe is mounted within the inlet pipe;
  an inward boss is provided on the inner wall of the inlet pipe into which a valve body of the reference chamber valve is screwed through threads,
  a sealing collar is provided between the valve body and the boss,
  a valve core of the reference chamber valve is inserted into the middle of the valve body and extended out from a front end of the valve body with a nut being screwed on the end portion of the extended end,
  an annular groove having a sealing ring mounted therein is extended outward from an edge position of the nut,
  a flange is provided at a position opposing to the valve core so that the sealing collar is clamped between the nut and the flange, and
  an end face of the sealing ring runs beyond the edge of the flange with the exceeded portion being opposite to a front end face of the valve body; and
  the valve core of the reference chamber valve is directly resisted against a core bar of a throttle core or against the core bar of the throttle core via:
    an ejector rod,
    a spring being provided between the valve core and the valve body, the spring applying a force onto the valve core so that the edge of the sealing ring running beyond the flange can be tightly pressed on the front end face of the valve body;
  wherein when the tire is being inflated through the vale stem, the throttle core in the valve stem is pushed open, and the core bar, the ejector rod, the sealing ring, the nut, the throttle core, the valve body and the reference chamber valve cooperated to result in the reference chamber being opened for inflation air to enter the reference chamber through an opening of the reference chamber;
  after the inflation is accomplished, the throttle core, the core bar, the ejector rod, the reference chamber valve, the spring, the valve core, the sealing ring, the flange and the valve body cooperated to result in the reference chamber valve being closed to seal the reference chamber to keep pressure inside the reference chamber constant; and
  responsive to tire pressure dropping to a certain degree after said inflation is accomplished, the pressure inside the reference chamber remains unchanged, and a difference in pressure between the inside and outside of the reference chamber is resulted to cause the elastic metal diaphragm as the wall of the reference chamber to deform outwardly to come into contact with the anode contact of the alarming signal transmitting module to power on the alarming signal transmitting module to send an alarm signal to a remote alarm output device.

2. The built-in tire pressure monitoring and alarming device according to claim 1, wherein the housing is divided into upper and lower portions which are in threaded connection to each other.

* * * * *